(12) United States Patent
Zhang

(10) Patent No.: US 12,362,444 B2
(45) Date of Patent: Jul. 15, 2025

(54) REVERSAL DEVICE FOR Li-ION CELL OVERCHARGE PROTECTION

(71) Applicant: CPS Technology Holdings LLC, New York, NY (US)

(72) Inventor: Xugang Zhang, Shorewood, WI (US)

(73) Assignee: CPS Technology Holdings LLC, New York, NY (US)

( * ) Notice: Subject to any disclaimer, the term of this patent is extended or adjusted under 35 U.S.C. 154(b) by 242 days.

(21) Appl. No.: 16/764,429

(22) PCT Filed: Nov. 20, 2018

(86) PCT No.: PCT/US2018/062118
§ 371 (c)(1),
(2) Date: May 15, 2020

(87) PCT Pub. No.: WO2019/100075
PCT Pub. Date: May 23, 2019

(65) Prior Publication Data
US 2020/0358072 A1    Nov. 12, 2020

Related U.S. Application Data

(60) Provisional application No. 62/588,570, filed on Nov. 20, 2017.

(51) Int. Cl.
*H01M 50/578* (2021.01)
*H01M 10/0525* (2010.01)
*H01M 50/342* (2021.01)

(52) U.S. Cl.
CPC ..... *H01M 50/578* (2021.01); *H01M 10/0525* (2013.01); *H01M 50/3425* (2021.01); *H01M 2200/20* (2013.01); *H01M 2220/20* (2013.01)

(58) Field of Classification Search
CPC ......... H01M 2200/20; H01M 10/0525; H01M 50/578; H01M 50/3425; H01M 2220/20
See application file for complete search history.

(56) References Cited

U.S. PATENT DOCUMENTS 8,525,055 B2 *   9/2013   Brazier ............... H01M 50/325
                                                    200/83 R
2015/0295222 A1 * 10/2015 Kwak ................... H01M 50/15
                                                    429/61
(Continued)

FOREIGN PATENT DOCUMENTS

CN    107123784 A    9/2017
JP    2012513098 A   6/2012
(Continued)

OTHER PUBLICATIONS

JP-2013157149-A English machine translation (Year: 2023).*
(Continued)

*Primary Examiner* — Armindo Carvalho, Jr.
(74) *Attorney, Agent, or Firm* — Boardman & Clark LLP

(57) ABSTRACT

A lithium-ion battery cell includes a casing, a first terminal pad having a first polarity and positioned proximate the casing, a second terminal pad having a second polarity opposite to the first polarity and positioned proximate the casing, and a reversal device formed into the casing and responsive to an increase in internal pressure within the casing so as to cause a short circuit between the first terminal pad and the second terminal pad when the internal pressure reaches a threshold. The reversal device has a folded configuration and an unfolded configuration, and is configured to transition from the folded configuration to the unfolded configuration in response to an increase in the internal pressure from below the threshold to the threshold.

18 Claims, 8 Drawing Sheets

(56) References Cited

U.S. PATENT DOCUMENTS

2016/0036033 A1* 2/2016 Zhang ................. H01M 50/578
                                                    429/53
2017/0229702 A1* 8/2017 Umeyama ........... H01M 50/543

FOREIGN PATENT DOCUMENTS

| JP | 2013157149 A | * | 8/2013 |
| JP | 2017027779 A | | 2/2017 |
| WO | WO 2018/026850 A1 | | 2/2018 |

OTHER PUBLICATIONS

International Search Report and Written Opinion of the International Searching Authority dated Feb. 15, 2019 for PCT/US2018/062118 filed Nov. 20, 2018, 46 pgs.

* cited by examiner

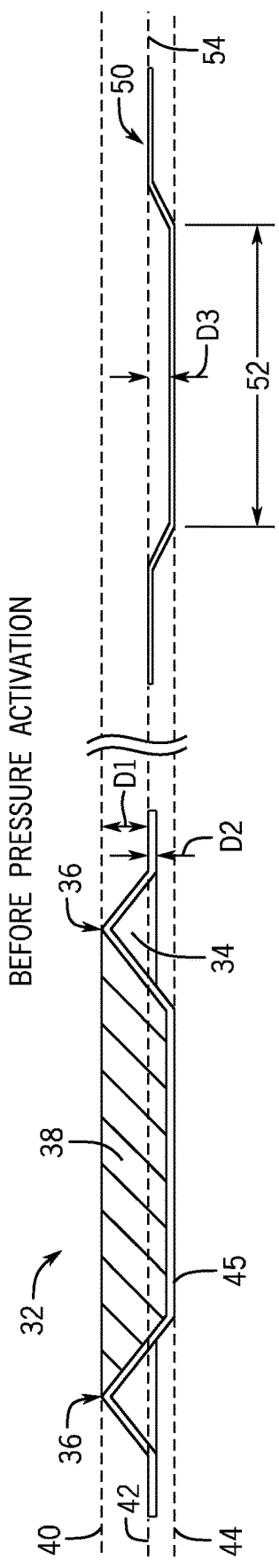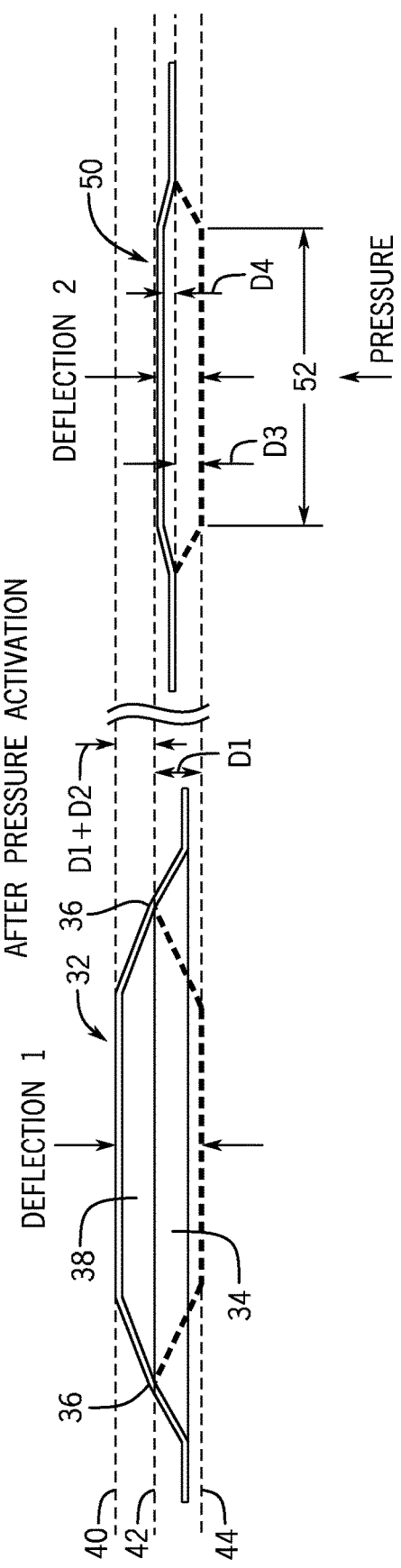

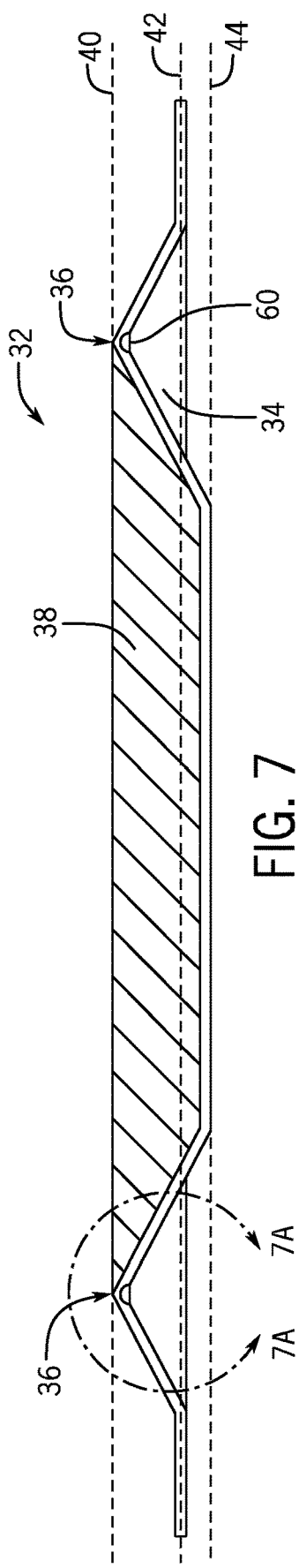
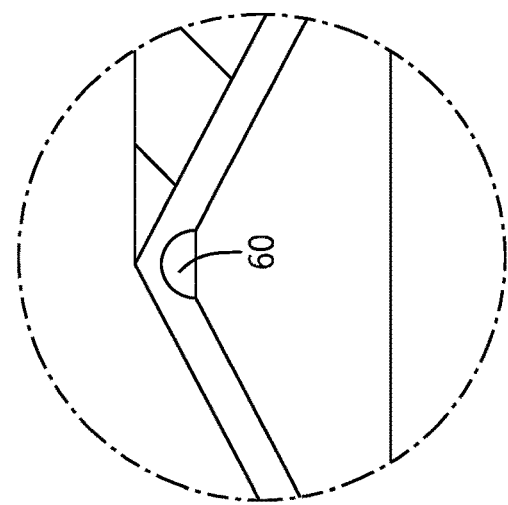
FIG. 7
FIG. 7A

REVERSAL DEVICE FOR Li-ION CELL OVERCHARGE PROTECTION

CROSS REFERENCE TO RELATED APPLICATIONS

This application is a national phase filing of International Patent Application No. PCT/US2018/062118 entitled "REVERSAL DEVICE FOR LI-ION CELL OVERCHARGE PROTECTION," which has an international filing date of Nov. 20, 2018, and which claims priority from and the benefit of U.S. Provisional Application Ser. No. 62/588,570, entitled "REVERSAL DISK FOR LI-ION CELL OVERCHARGE PROTECTOR," filed Nov. 20, 2017, the entirety of all of which are hereby incorporated by reference herein for all purposes.

BACKGROUND

The present disclosure relates generally to the field of batteries and battery modules. More specifically, the present disclosure relates to features of a battery cell that may protect a battery module from thermal runaway during an overcharge event.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives, or contributes to drive, the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, battery modules may undergo overcharge testing to determine boundaries and/or limits of the battery module and its individual battery cells. Additionally, in certain instances, for example due to changing environmental conditions or other operating conditions, battery cells may be subject to overcharging. Overcharge tests and overcharging may lead to thermal runaway (e.g., an internal short circuit) caused by overheating in the battery cells. Thermal runaway may render the battery cell and an associated battery module permanently inoperable. Therefore, devices that may prevent or block thermal runaway are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a lithium-ion battery cell including a casing; a first terminal pad having a first polarity and positioned proximate the casing; a second terminal pad having a second polarity opposite to the first polarity and positioned proximate the casing; a reversal device formed into the casing and responsive to an increase in internal pressure within the casing so as to cause a short circuit between the first terminal pad and the second terminal pad when the internal pressure reaches a threshold. A perimeter portion of the reversal device extends outwardly away from an interior of the lithium-ion battery cell, and a movable central portion of the reversal device is contiguous with and surrounded by the perimeter portion and has a center and a frustum surrounding the center. The frustum and the perimeter portion are oriented crosswise relative to one another, and the frustum extends from the perimeter portion toward the interior of the lithium-ion battery cell.

The present disclosure also relates to a lithium-ion battery module having a housing and a plurality of lithium-ion battery cells positioned within the housing. Each lithium-ion battery cell of the plurality of lithium-ion battery cells includes a casing, a first terminal pad having a first polarity and positioned proximate the casing, a second terminal pad having a second polarity opposite to the first polarity and positioned proximate the casing, and a reversal device formed into the casing and responsive to an increase in internal pressure within the casing so as to cause a short circuit between the first terminal pad and the second terminal pad when the internal pressure reaches a threshold. A perimeter portion of the reversal device extends outwardly away from an interior of the lithium-ion battery cell, and a movable central portion of the reversal device is contiguous with and surrounded by the perimeter portion and has a center and a frustum surrounding the center. The frustum and the perimeter portion are oriented crosswise relative to one another, and the frustum extends from the perimeter portion toward the interior of the lithium-ion battery cell.

The present disclosure also relates to a lithium-ion battery cell includes a casing, a first terminal pad having a first polarity and positioned proximate the casing, a second terminal pad having a second polarity opposite to the first polarity and positioned proximate the casing, and a reversal device formed into the casing and responsive to an increase in internal pressure within the casing so as to cause a short circuit between the first terminal pad and the second terminal pad when the internal pressure reaches a threshold. The reversal device has a folded configuration and an unfolded configuration, and is configured to transition from the folded configuration to the unfolded configuration in response to an increase in the internal pressure from below the threshold to the threshold.

DRAWINGS

Various aspects of this disclosure may be better understood upon reading the following detailed description and upon reference to the drawings in which:

FIG. 5 is a side-by-side cross-sectional view of reversal device and reverse buckling device, in accordance with an embodiment of the present disclosure;

FIG. 6 is a side-by-side cross-sectional view of reversal device and reverse buckling device, in accordance with an embodiment of the present disclosure;

FIG. 7 is a cross-section view of another example of reversal device, in accordance with an embodiment of the present disclosure;

FIG. 7A is a cross-section focused view of the reversal device of FIG. 7.

DETAILED DESCRIPTION

Figure 1:
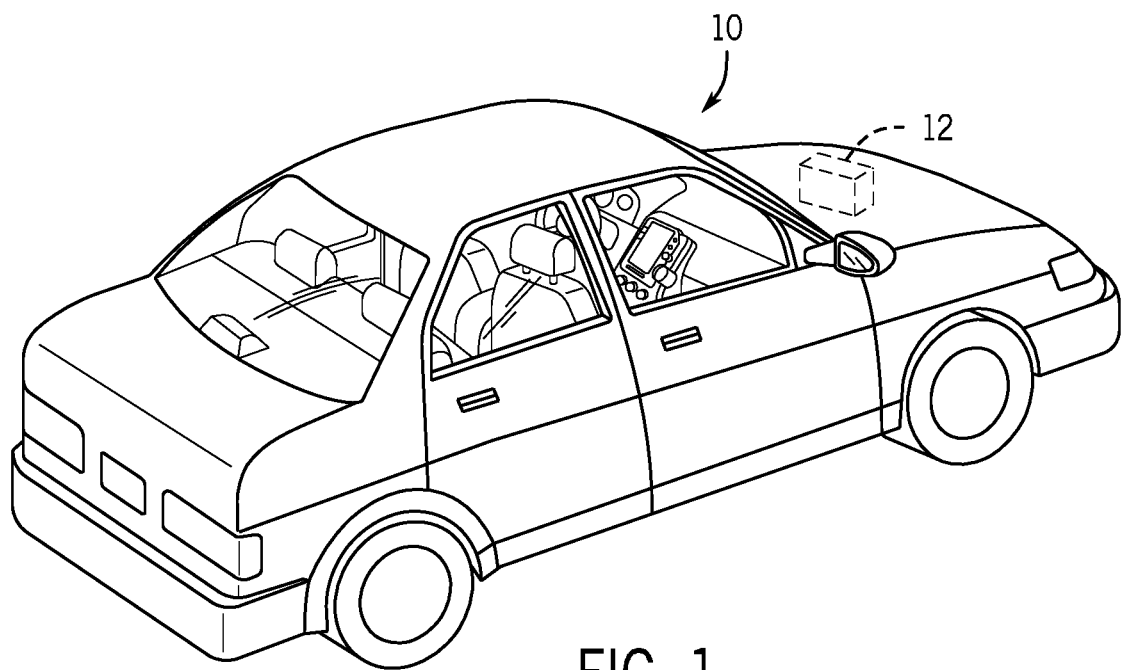
FIG. 1 is a perspective view of a vehicle having a battery system configured in accordance with present embodiments to provide power for various components of the vehicle, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., Lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

During the design and manufacturing process of a battery module, various tests may be performed upon the battery module and its individual battery cells to determine optimal performance parameters. For example, overcharge tests may provide excess electrical current to an individual battery cell of a battery module using a power supply with a voltage that exceeds a voltage of the individual battery cell. Overcharge testing may provide data related to temperature, heat output, and/or voltage of the overcharged battery cell, which may enable designers or manufacturers to modify various components of the battery cell to enhance performance (e.g., minimize damage to an overcharged battery cell). Therefore, such tests may be desirable for providing information that may enable manufacturers to optimize a battery module. In addition to overcharge testing, battery cells may be overcharged as a result of environmental conditions or abnormal operating parameters.

In certain cases, overcharging a battery cell may lead to thermal runaway (e.g., an internal short circuit) or another event causing permanent damage to the battery cell. For instance, charging a battery cell may generate dendrites as a result of intercalation of positive ions in the anode. Thermal runaway may result due to an excess buildup of dendrites on a separator of a battery cell (e.g., the dendrites may penetrate the separator enabling mixing of the positive electrode and the negative electrode) when the battery cell is overcharged (e.g., from an overcharge test or under abnormal operating conditions). Thermal runaway may be undesirable because it generates excessive heat, which may cause permanent damage to the battery cell and/or render the battery cell permanently inoperable.

Various features may be included as part of the battery cell that prevent or block thermal runaway when the battery cell is overcharged. Some battery cells may include a mechanism that completely breaks (e.g., disrupts a flow of electrical current) an electrical connection to at least one terminal of the battery cell when a pressure in the battery cell reaches a certain level. Such a mechanism thereby disrupts current flow to at least one terminal of the battery cell, which may ultimately lead to decreased current capacity of the battery cell. Such configurations may be referred to as including a current interrupt device (CID).

Other configurations may maintain the electrical connection to one or both terminals of the battery cell while preventing thermal runaway during overcharge. Such configurations may be referred to as including a complete current discharge device (CCD). For example, in such configurations, when a pressure in the battery cell exceeds a threshold level, an external short circuit may be triggered by electrically coupling the positive terminal and the negative terminal of the battery cell via a casing of the battery cell, for example. Accordingly, thermal runaway may be prevented and an electrical current capacity of the battery cell terminals is not reduced because the electrical pathway (e.g., connection) from an external load to the terminals remains intact.

In accordance with present embodiments, a battery cell includes an overcharge protection assembly that has a reversal device, the reversal device having a folded configuration that unfolds in response to an increase in internal cell pressure. The unfolded configuration that results causes a conductor associated with the reversal device to contact positive and negative terminal pads of the battery cell, thereby forming a short circuit. The current spike resulting from the short circuit may cause a current load on one of the current collectors of the battery cell to be greater than the current collector can handle. This may cause melting of the current collector and an interrupt in current flow and, therefore, overcharge.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
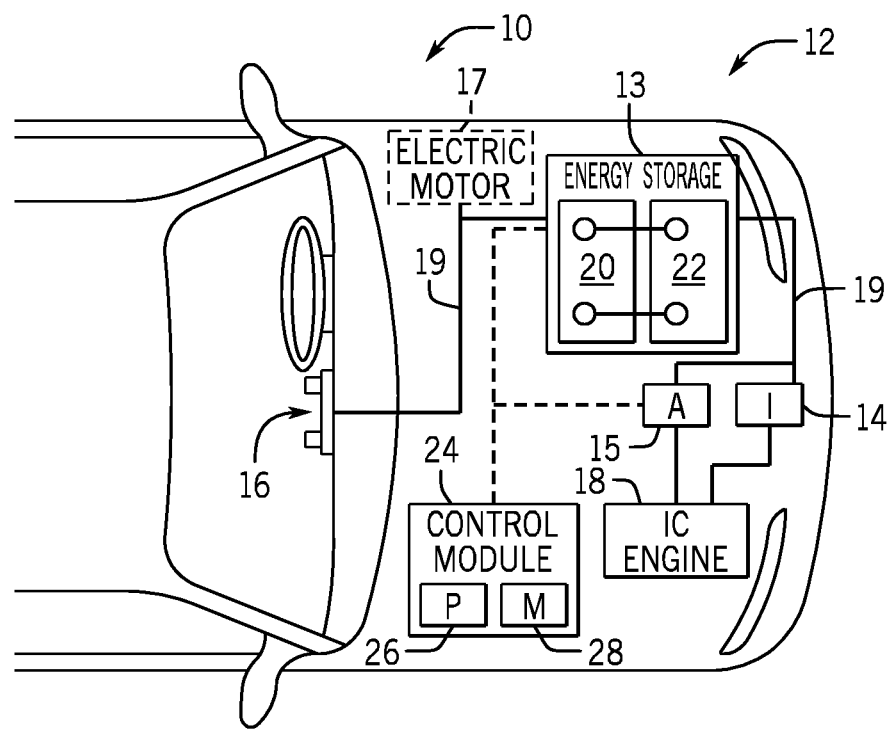
FIG. 2 is a cutaway schematic view of an embodiment of the vehicle and the battery system of FIG. 1, in accordance with an embodiment of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/ or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control module 24 may include one or more processors 26 and one or more memory components 28. More specifically, the one or more processors 26 may include one or more application specific integrated circuits (ASICs), one or more field programmable gate arrays (FPGAs), one or more general purpose processors, or any combination thereof. Additionally, the one or more memory components 28 may include volatile memory, such as random access memory (RAM), and/or non-volatile memory, such as read-only memory (ROM), optical drives, hard disc drives, or solid-state drives. In some embodiments, the control module 24 may include portions of a vehicle control unit (VCU) and/or a separate battery control module.

As discussed above, before a battery module may be used to supply power to an xEV, various tests may be conducted upon the battery module and its individual battery cells to optimize operating parameters of the battery module. One such test may be an overcharge test that determines how much electrical current a battery cell may receive, or how long a battery cell may receive an electrical current, before damage occurs to the battery cell. However, in certain instances, overcharge tests may result in thermal runaway (e.g., an internal short circuit within the battery cell), which may cause permanent damage to the battery cell because of excess heat generated from the overcharge. It is now recognized that it may be desirable to prevent thermal runaway (e.g., an internal short circuit) by triggering an external short circuit (e.g., electrically coupling the positive terminal and the negative terminal of the battery cell) before thermal runaway occurs. In certain embodiments, the external short circuit may be triggered by establishing an electrical connection between terminals of the battery cell, or between a terminal of the battery cell and the cell casing (e.g., can) in embodiments where the can is polarized.

Figure 3:
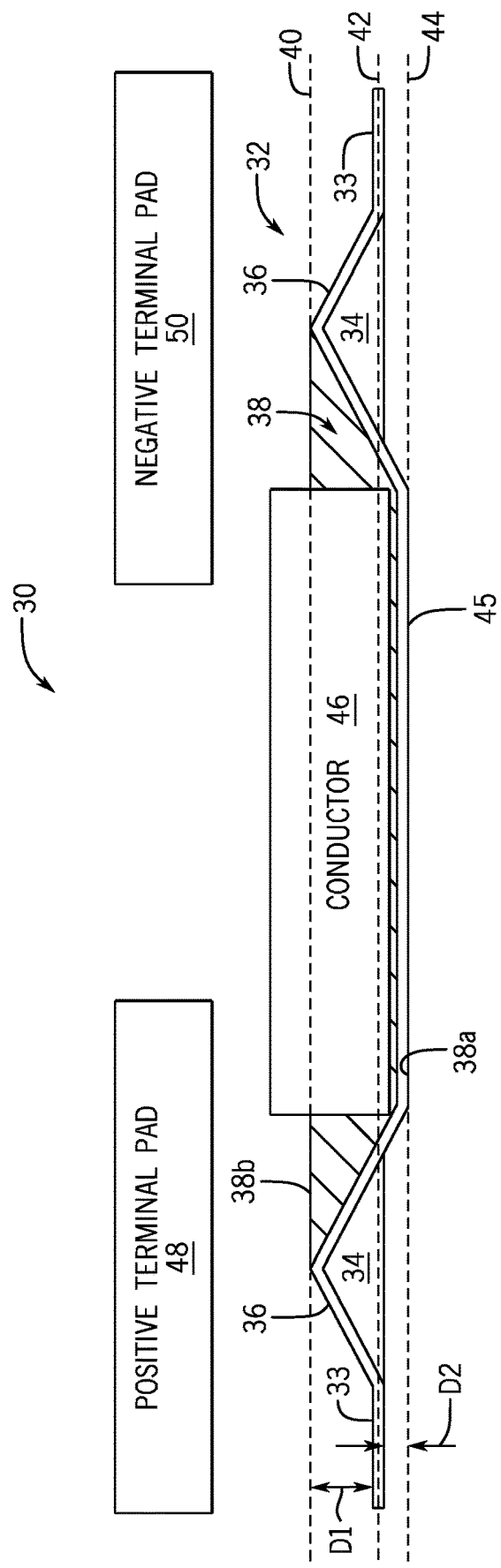
FIG. 3 is a cross-sectional view of one embodiment of reversal device applied to a battery environment, in accordance with an embodiment of the present disclosure.
Figure 4:
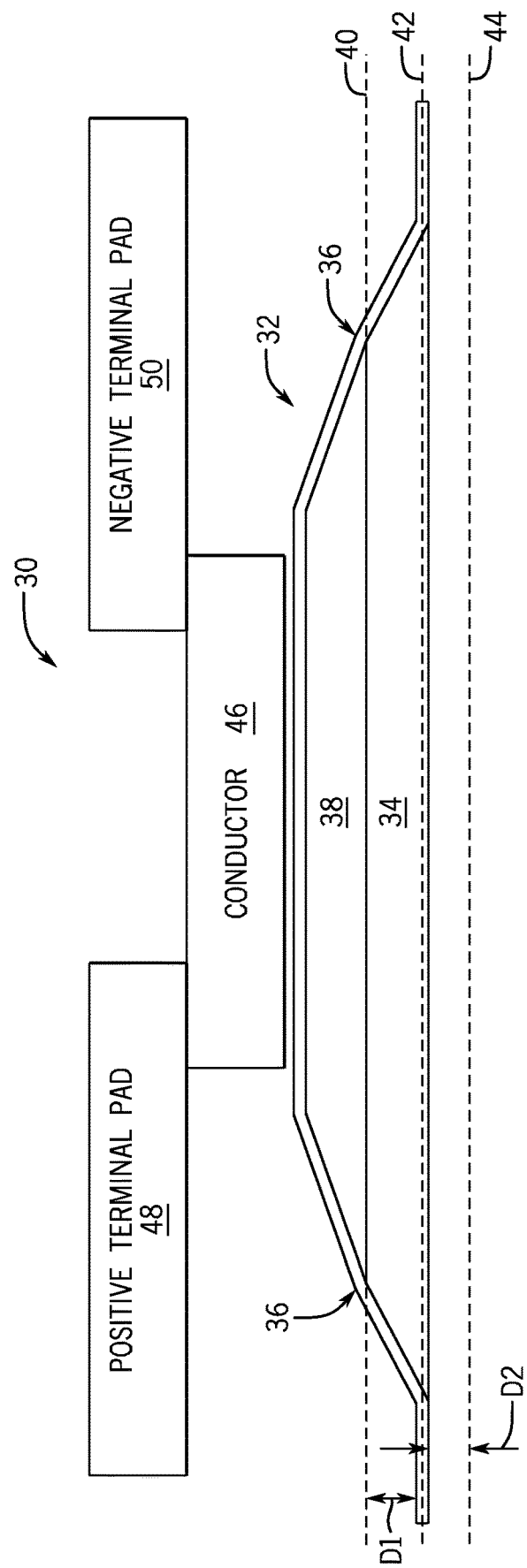
FIG. 4 is a cross-section view of the embodiment of reversal device 32 applied to the battery environment after activation, in accordance with an embodiment of the present disclosure.

FIG. 3 is a cross-sectional elevation view of an embodiment of an overcharge protection assembly 30 configured in accordance with the present disclosure. In one or more embodiments, the assembly 30 includes a reversal device 32 formed into a casing 33 (e.g., a lid) of a lithium ion battery cell, the reversal device 32 having a folded configuration, which is shown in FIG. 3, and an unfolded configuration, which is shown in FIG. 4. The reversal device 32 is responsive to a change in the internal pressure of the battery cell on which it is integrated, and transforms from the configuration in FIG. 3 to the configuration shown in FIG. 4 in response to the internal pressure of the battery cell reaching a threshold.

In one or more embodiments, the reversal device 32 is circular in shape. Other shapes can be used, as long as they operate in accordance with the principles as described herein. The reversal device 32 includes a perimeter portion 34, a folding portion 36 and a movable central portion 38. As shown, the perimeter portion 34 and the movable central portion 38 are joined at a ridge, which corresponds to the folding portion 36. The illustrated movable central portion 38 includes a center portion 38a, such as a disk, and a frustum 38b that surrounds the center portion 38a and that is directly joined (e.g., integrally formed) with the perimeter portion 34. In the illustrated embodiment, the frustum 38b is a conical frustum. The frustum 38b and the perimeter portion 34 are oriented crosswise relative to one another, and the frustum 38b extends from the perimeter portion 34 toward the interior of the lithium-ion battery cell.

The reversal device 32 intersects one or more planes such as an expansion plane 40, a base plane 42 and a non-expansion plane 44 that are described in detail herein. The folding portion 36 is configured to allow the movable central portion 38 to intersect the base plane 42 before pressure activation. In particular, the folding portion 36 corresponds to a portion of the reversal device 32 where the movable central portion 38 meets the perimeter portion 34.

The reversal device 32 is configured such that the perimeter portion 34 of the reversal device 32 angles away from the base plane 42 while the folding portion 36 angle the movable central portion 38 of the reversal device 32 back towards the base plane 42, thereby creating an indent or cup shape. In one or more embodiments, the perimeter portion 34 extends upward and inward from the base plane 42. In one or more embodiments, the movable central portion 38 is contiguous with and surrounded by the perimeter portion 34, and the movable central portion 38 allows expansion of the reversal device 32 when activated to intersect the expansion plane 40. In one or more embodiments, the movable central portion 38 and the perimeter portion 34 meet at the folding portion 36 of the reversal device 32.

The distance from the base plane 42 to the folding portion 36 is denoted as D1 while the distance from the folding portion 36 to a base 45 or lower part of the movable central portion 38 is denoted as D2. The base 45 of the movable central portion 38 intersects the non-expansion plane 44 if the reversal device 32 is not activated or if the reversal device 32 is in a first position. In other words, before pressure activation, in one or more embodiments, the reversal device 32 includes the perimeter portion 34 to one side of the base plane 42 and the movable central portion 38 on both sides of the base plane 42. The configuration of the reversal device 32 increases the top-to-top deflection (e.g., overall movement of the base 45) of the reversal device 32 as compared with other devices, thereby reducing faulty triggering due to, for example, vibrations of an automobile or failure to make good contact with short circuit pads.

The overcharge protection assembly 30 includes a conductor 46, a positive terminal pad 48 and a negative terminal pad 50. In the embodiment of FIG. 3, the conductor 46 is positioned at least partially within an indent or cup defined by the movable central portion 38. The positive terminal pad 48 and the negative terminal pad 50 are positioned proximate the conductor 46, and are configured to provide power to one or more loads such as an automobile or car. In particular, the reversal device 32, in this embodiment, may be used for overcharge protection of a lithium ion battery module (e.g., module 20) with one or more lithium ion cells where activation of the reversal device 32 places the conductor 46 in electrical communication with the positive terminal pad 48 and the negative terminal pad 50, thereby creating a short circuit as illustrated in FIG. 4.

In the illustrated embodiment of FIG. 3, the perimeter portion 34 extends from a casing of the battery cell toward the general direction of the positive and negative terminal pads 48, 50, while the frustum 38b of the movable center portion 38 extends away from the positive and negative terminal pads 48, 50. Such a configuration creates a fold in the reversal device 32, which, as described in further detail herein, provides for a greater overall distance of deflection by the center 38b and, therefore, greater axial movement of the conductor 46. This greater distance of deflection allows for, among other things, the prevention of accidental triggering of a short circuit.

In transitioning the configuration of the reversal device 32 from the configuration of FIG. 3 to the configuration of FIG. 4, the movable central portion 38 of the reversal device 32 is moved from a first position (before activation) to a second position (after activation) such that the conductor 46 is moved into the shorting position. Activation in this embodiment may be caused, for example, by overcharging where internal pressure of the battery increases such as to cause the reversal device 32 to unfold and thereby reposition the movable central portion 38 from a first position to a second position. In some embodiments, this external short generates a high current spike that causes an internal current collector of the battery to fail (e.g., melt), thereby stopping the overcharge of the battery. In other embodiments, the short triggers an overcurrent protection mechanism in the charging device used to charge the battery, thereby discontinuing the charging.

FIG. 5 is a side-by-side cross-sectional view of reversal device 32 and a reverse buckling device 50, which does not include folding portion 36 or perimeter portion 34. In one or more embodiments, distance D2 from the folding portion 36 of the reversal device 32 to the base plane 42 is equal to a distance D3 from a central portion 52 of reverse buckling device 50 to a plane 54. However, for top-to-top deflection, i.e., activation, the base 45 of the central portion 38 traverses distances D1 and D2 to reach the same plane 40 as the folding portion 36, and then traverses distances D1 and D2 (height of movable central portion 38) to reach full deflection as illustrated in FIG. 6.

FIG. 6 is a side-by-side cross sectional view of the reversal device 32 and the reverse buckling device 50, where both the reversal device 32 and the reverse buckling device 50 have been activated. The central portion 52 of the reverse buckling device 50 traverses distances D3 and D4 to reach full top-to-top deflection. The shortened distance of top-to-top deflection for the central portion 52 makes this configuration susceptible to faulty activation, while the reversal device 32 cures at least some of the deficiencies of the reverse buckling device 50 by increasing top-to-top deflection distance.

The arrangement of the reversal device 32 allows for a larger separation between the reversal device 32 and the short circuit pads when in a deactivated state as compared with other devices. This arrangement therefore avoids unintended activation resulting from vibration and allows for a more positive connection with the short circuiting pads when activated. In one or more embodiments, at least a portion of the movable central portion 38 intersects the base plane 42 if the reversal device 32 is not activated, i.e., if the reversal device 32 is in the first position. In one or more embodiments, the movable central portion 38 does not intersect the base plane 42 and/or the expansion plane 40 if the reversal device 32 is activated, i.e., if the reversal device 32 is in the second position. In one or more embodiments, the movable central portion 38 forms an indent or first cup facing a first direction if the reversal device 32 is not activated (e.g., in the first position). In one or more embodiments, the movable central portion 38 forms an indent or second cup facing a second direction opposite a first direction if the reversal device 32 is activated (e.g., is in the second position). In one or more embodiments, the movable central portion 38 is pivoted about the folding portion 36 if the reversal device 32 is activated.

Figure 8:
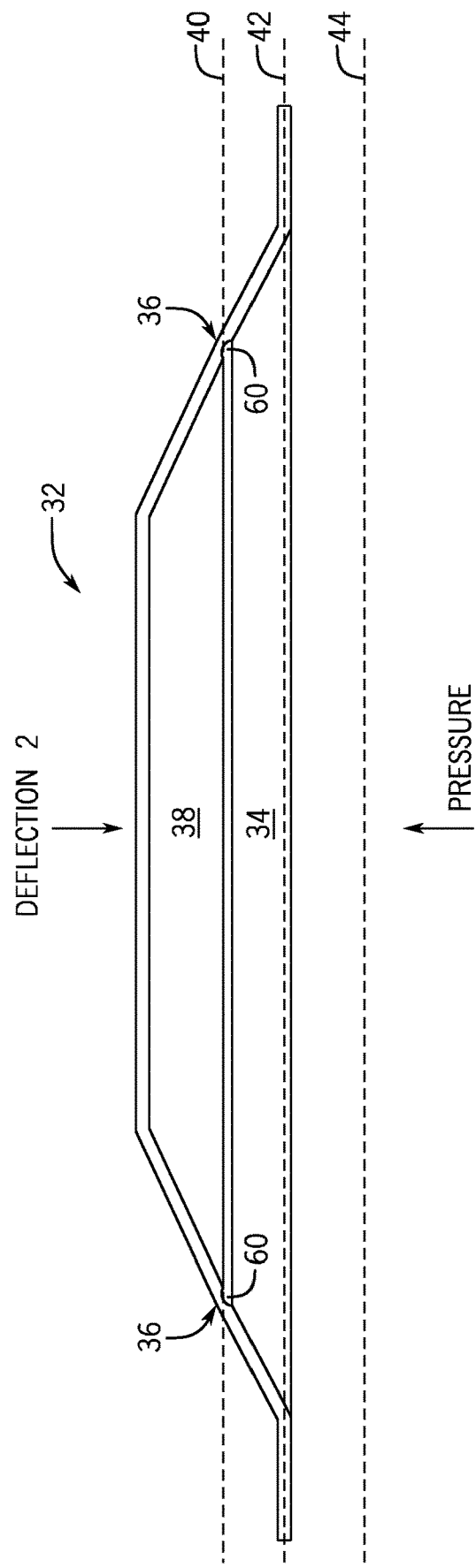
FIG. 8 is a diagram of illustrates top-to-top deflection of reversal device, in accordance with an embodiment of the present disclosure.

FIG. 7 is a cross-sectional elevation view of another example of the reversal device 32 in accordance with certain embodiments of the disclosure. The illustrated reversal device 32 of FIG. 7 includes one or more notches 60 formed in the folding portion 36. The strain hardening around fold portion 36 introduced by a forming process of creating the reversal device 32 may, in some instances, make the reversal device 32 harder to fully unfold, i.e., harder to achieve top-to-top deflection. The notch 60 helps alleviate at least some of the drawbacks to the manufacturing process by thinning a section of the folding portion 36 to facilitate unfolding to a higher degree, which increases top-to-top deflection as illustrated in FIG. 8, where top-to-top deflection reduces faulty activations. In one or more embodiments, the movable central portion 38 and the perimeter portion 34 define the notch 60 proximate a point of contact between the movable central portion 38 and the perimeter portion 34. In one or more embodiments, the notch 60 is a region of reduced thickness of a portion of the movable central portion 38 and a thickness of a portion of the perimeter portion 34. In one or more embodiments, the movable central portion 38 and the perimeter portion 34 define a groove surrounding the movable central portion 38, the groove corresponding to the notch 60.

Figure 9:
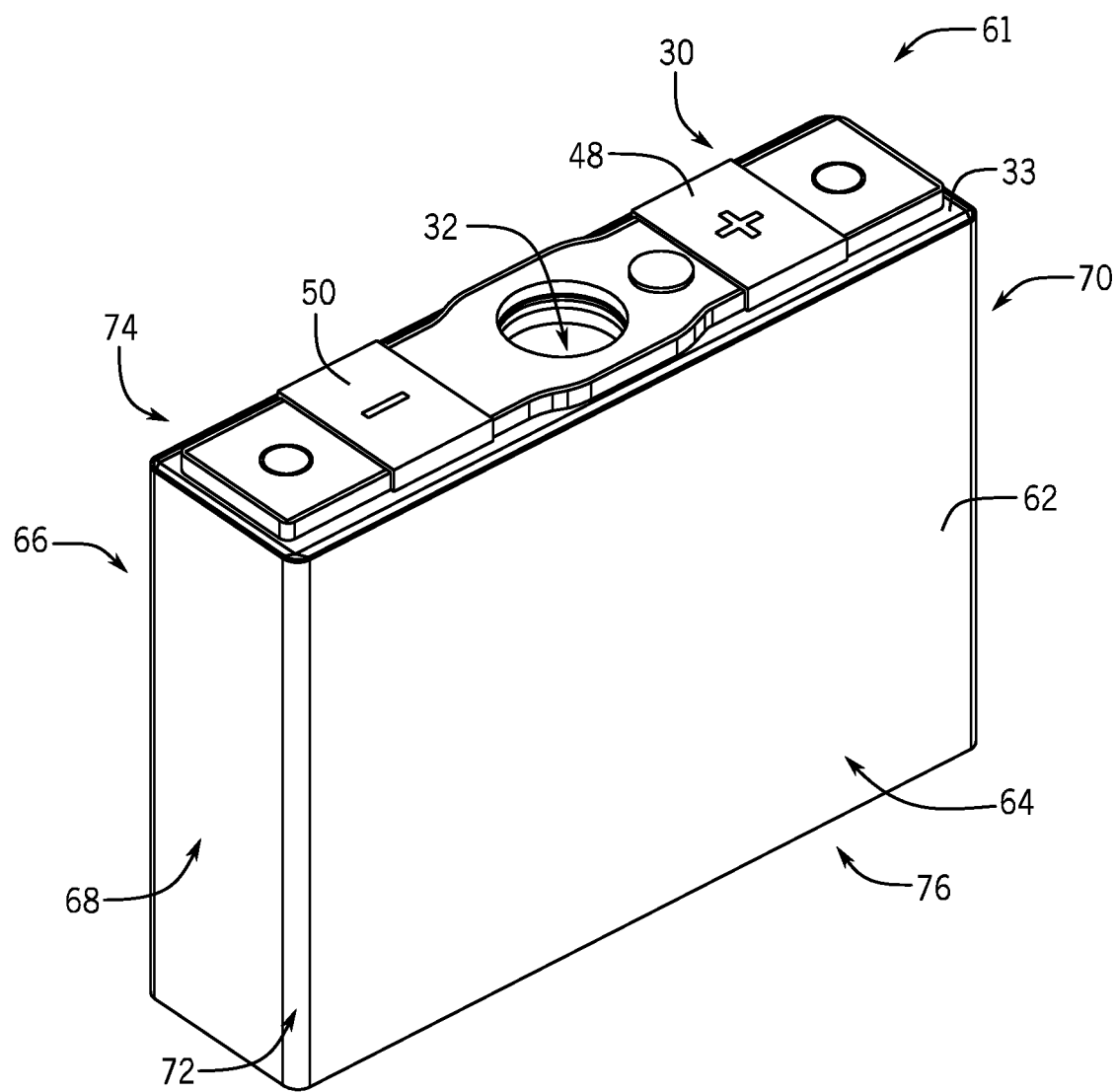
FIG. 9 is a perspective view of a battery cell having a reversal device, in accordance with an embodiment of the present disclosure.

As set forth above, the overcharge protection assembly 30 may be integrated into a lithium-ion battery cell. FIG. 9 is a perspective view of an embodiment of a prismatic lithium ion battery cell 61 having the overcharge protection assembly 30—specifically, the reversal device 32 is formed into a packaging 62 of the cell 61. As used herein, "prismatic" refers to the generally box-like (e.g., polygonal) shape of the substantially rigid packaging 62 of the battery cell 61, where the packaging 62 corresponds to or includes the casing 33. As such, it should be appreciated that the disclosed prismatic cells 61 are distinct from pouch battery cells, which have a substantially flexible laminate packaging. Further, it should be appreciated that the disclosed prismatic cells 61 are also distinct from cylindrical battery cells, which have a substantially rigid cylindrical packaging. Those skilled in the art will appreciate that these different cell shapes and packaging materials present different limitations and modes of failure, and issues or solutions that are effective for one type of battery cell may not be applicable to others. The packaging 62 may be metallic or polymeric, or a combination. In one embodiment, the packaging 62, including the casing 33, is aluminum and the reversal device 32 is aluminum. In certain embodiments of the battery cell 61, the reversal device 32 may act as a vent mechanism for the battery cell 61, such that at a first pressure threshold, the reversal device causes the short circuit discussed above. At a second pressure threshold higher than the first, the reversal device 32 may rupture from the casing 33, and allow for cell effluent to be controllably released from the interior of the battery cell 61.

The packaging 62 of the illustrated prismatic lithium ion battery cell 61 may be generally described as having a first and a second substantially flat side portion, 64 and 66, disposed opposite one another. Additionally, the packaging 62 includes a first and a second end portion 68 and 70, disposed opposite one another. In certain embodiments, the end portions 68 and 70 may be substantially flat, rounded, or substantially flat will slight rounded corners 72, as illustrated.

The positive and negative terminal pads 48, 50 are shown as positioned at a terminal end 74 of the battery cell 61, which is situated at an opposite end from the base 76 of the battery cell 61. In this way, referring to FIGS. 3 and 9 in combination, it should be appreciated that the perimeter portion 34 extends generally along an angled direction from the base 76 toward the terminal end 74, and the frustum 38b extends generally along an angled direction from the terminal end 74 to the base 76. Activation of the reversal device 32 results in movement of the center 38a in a direction from the base 76 toward the terminal end 74.

Figure 10:
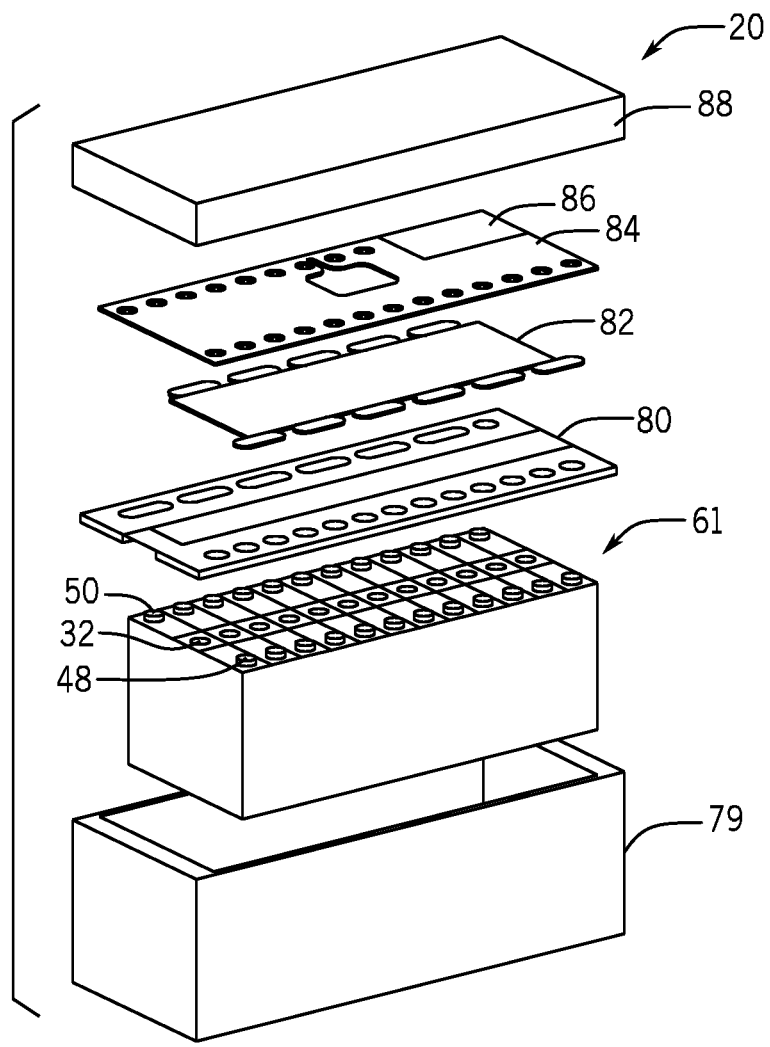
FIG. 10 is an exploded perspective view of a battery module having a plurality of the battery cells of FIG. 9, in accordance with an embodiment of the present disclosure.

As set forth above, a lithium-ion battery module, such as the lithium-ion battery module 20 may include multiple of the lithium-ion battery cells 61. FIG. 10 is a perspective view of an example embodiment of the lithium-ion battery module 20 having a housing 79 containing a plurality of lithium-ion battery cells 61. Specifically, FIG. 10 is an exploded perspective view of an embodiment of the battery module 20, which may be used in the xEV 10 of FIG. 1, or another system, such as a stationary storage system. As illustrated, certain embodiments of the battery module 20 include a plurality of the prismatic lithium ion battery cells 61, which may be arranged in various configurations (e.g., orientations, orders of stacking). However, the cells 61 will generally be provided in an amount and configuration so as to have a sufficient energy density, voltage, current, capacity, and so forth, for a particular stationary application. As discussed in greater detail below, in different embodiments, the cells 61 may have a polymeric casing, or a metallic casing, or a combination, enclosing the electrochemically active components of the battery cells 61.

The battery module 20 of FIG. 10 includes a stack or lineup of the battery cells 61, with a bus bar carrier 80 being positioned over terminals (e.g., terminal pads 48, 50) so as to enable electrical interconnection of the battery cells 61 using the bus bar assembly 82. The bus bar assembly 82 generally electrically connects the battery cells 61 as an electrical assembly. In certain embodiments, the bus bar assembly 82 may be integrated onto the bus bar carrier 80, in some instances along with other suitable features (e.g., voltage sense connectors).

For the illustrated embodiment, a traceboard 84 is positioned over the bus bar assembly 82 such that the bus bar assembly 82 is positioned between the traceboard 84 and the bus bar carrier 80. A battery management system (BMS) 86 is integrated onto the traceboard 84 to connect the BMS 86 to any sense features (e.g., temperature and/or voltage sense features) and to enable control of the cells 61 and the overall operation of the battery module 20.

The housing 79 of the illustrated embodiment completely encloses the cells 61. As illustrated, the module housing 79 takes the shape of its constituent battery cells 61; in this instance a prismatic form. However, the housing 79 may be formed to have any appropriate shape for a particular application. A cover 88 is provided above the BMS 86, traceboard 84, and bus bar assembly 80 and attaches to an upper portion of the battery module housing 79. The cover 88 is configured to substantially enclose the BMS 86, traceboard 84, and bus bar assembly 82 to prevent inadvertent contact with electrical and control components.

One or more of the disclosed embodiments, alone or in combination, may provide one or more technical effects useful in the manufacture of battery modules, and portions of battery modules. The disclosed embodiments relate to battery cells that include an overcharge protection assembly. The overcharge protection assembly may include a reversal device that is activated when a pressure in a casing of the battery cell reaches a threshold value. The activation of the reversal device may cause electrical contact between terminals of the battery cell, which may create an external circuit by electrically coupling the positive terminal and the negative terminal of the battery cell. Such an external short circuit may discharge the battery cell, but the external short circuit may prevent thermal runaway and/or permanent damage to the battery cell. Additionally or alternatively, the short circuit may cause a large amount of current to be transmitted through an internal current collector of the battery cell, which may cause the current collector to melt and thereby cut the flow of electric current. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A lithium-ion battery cell, comprising:
a casing;
a first terminal pad having a first polarity and positioned proximate the casing;
a second terminal pad having a second polarity opposite to the first polarity and positioned proximate the casing;
an reversal device formed into the casing and extended along a plane coplanar with respect to a surface of the casing, the reversal device positioned to be responsive to an increase in internal pressure within the casing and with a portion on the reversal device configured to directly contact the first terminal pad and the second terminal pad upon the internal pressure within the casing reaching a threshold to cause a short circuit between the first terminal pad and the second terminal pad when the internal pressure reaches the threshold;
a first ridge positioned between a stationary perimeter portion and a movable central portion of the reversal device, the stationary perimeter portion of the reversal device extending from the first ridge, outwardly away from the movable central portion of the reversal device with the extension from the first ridge away from the movable central portion being at a decline towards an interior of the lithium-ion battery cell and to the plane, the first ridge having a notch positioned towards an interior of the lithium-ion battery cell, with the first ridge having the notch being a first flex point;
the movable central portion of the reversal device contiguous with the stationary perimeter portion at the first ridge and comprising a center and a frustum surrounding the center, the center and the frustum contiguous at a second ridge, with the second ridge being a second flex point, with the center adjustable with respect to the frustum at the second flex point, wherein the frustum and the stationary perimeter portion are oriented crosswise relative to one another, and the frustum extended from the first ridge toward the interior of the lithium-ion battery cell; and the first flex point and the second flex point coordinated to facilitate transitioning of the reversal device from a folded configuration to an unfolded configuration.

2. The lithium-ion battery cell of claim 1, wherein the center of the movable central portion is a disk.

3. The lithium-ion battery cell of claim 1, wherein the portion on the reversal device configured to directly contact the first terminal pad and the second terminal pad comprising a conductor positioned on top of the center of the movable central portion, wherein the reversal device is configured to move the conductor into contact with the first terminal pad and the second terminal pad in response to the internal pressure reaching the threshold.

4. The lithium-ion battery cell of claim 1, wherein the reversal device is configured to transition from the folded configuration to the unfolded configuration in response to an increase in the internal pressure from below the threshold to the threshold.

5. The lithium-ion battery cell of claim 1, wherein the reversal device comprises a vent for the lithium-ion battery cell.

6. The lithium-ion battery cell of claim 1, wherein the stationary perimeter portion and the frustum are joined at the first ridge.

7. The lithium-ion battery cell of claim 1, wherein the first terminal pad is electrically coupled to a positive electrode of the lithium-ion battery cell, and the second terminal pad is electrically coupled to a negative electrode of the lithium-ion battery cell.

8. The lithium-ion battery cell of claim 1, wherein the casing and the reversal device are formed from aluminum.

9. A lithium-ion battery module comprising:
a housing;
a plurality of lithium-ion battery cells positioned within the housing, wherein each lithium-ion battery cell of the plurality of lithium-ion battery cells comprises a casing, a first terminal pad having a first polarity and positioned proximate the casing, a second terminal pad having a second polarity opposite to the first polarity and positioned proximate the casing, and an reversal device formed into the casing and extended along a plane coplanar with respect to a surface of the casing and responsive to an increase in internal pressure within the casing with a portion on the reversal device configured to contact the first terminal pad and the second terminal pad upon the internal pressure reaching a threshold, while the reversal device remaining in one-piece construction, so as to cause a short circuit between the first terminal pad and the second terminal pad when the internal pressure reaches the threshold;
a ridge positioned between a stationary perimeter portion and a movable central portion of the reversal device, the stationary perimeter portion of the reversal device extending from the ridge, outwardly away from the movable central portion of the reversal device with the stationary perimeter portion extended from the ridge with the extension from the ridge away from the movable central portion being at a decline towards an interior of the lithium-ion battery cell to the plane, the ridge having a notch positioned towards an interior of the lithium-ion battery cell, with the ridge having a notch being a first flex point;
the movable central portion of the reversal device is contiguous with the stationary perimeter portion at the ridge and comprises a center and a frustum surrounding the center, the center and the frustum in connection at a second flex point, with the center adjustable with respect to the frustum at the second flex point, wherein the frustum and the stationary perimeter portion are oriented crosswise relative to one another, and the frustum extended from the ridge toward the interior of the lithium-ion battery cell; and
the ridge having a notch positioned towards the interior of the lithium-ion battery cell, with the notch configured to facilitate transitioning of the reversal device from a folded configuration to an unfolded configuration.

10. The lithium-ion battery module of claim 9, wherein the center of the movable central portion is a disk.

11. The lithium-ion battery module of claim 9, wherein the portion on the reversal device configured to directly contact the first terminal pad and the second terminal pad comprising a conductor positioned on top of the center of the movable central portion, wherein the reversal device is configured to move the conductor into contact with the first terminal pad and the second terminal pad in response to the internal pressure reaching the threshold.

12. The lithium-ion battery module of claim 9, wherein the reversal device is configured to transition from the folded configuration to the unfolded configuration in response to an increase in the internal pressure from below the threshold to above the threshold.

13. The lithium-ion battery module of claim 9, wherein the reversal device comprises a vent for each lithium-ion battery cell of the plurality of lithium-ion battery cells.

14. The lithium-ion battery module of claim 9, wherein the stationary perimeter portion and the frustum are joined at the ridge.

15. A lithium-ion battery cell, comprising:
a casing;
a first terminal pad having a first polarity and positioned proximate the casing;
a second terminal pad having a second polarity opposite to the first polarity and positioned proximate the casing;
an reversal device formed coplanar to, and in extension along, a surface of the casing, and having a stationary perimeter portion extended in a direction outwardly away from a first ridge and a movable central portion of the reversal device at a decline towards an interior of the lithium-ion battery cell to a base plane, and responsive to an increase in internal pressure within the casing so as to cause a short circuit between the first terminal pad and the second terminal pad when the internal pressure reaches a threshold with a conductor of the reversal device configured to directly contact the first terminal pad and the second terminal pad upon the internal pressure reaching the threshold;
the reversal device comprises a folded configuration and an unfolded configuration, wherein the reversal device is configured to transition from the folded configuration to the unfolded configuration in response to an increase in the internal pressure from below the threshold to the threshold;
the first ridge positioned between the stationary perimeter portion and the movable central portion of the reversal device and a notch in the first ridge where the stationary perimeter portion and the movable central portion are joined, positioned towards an interior of the lithium-ion battery cell, configured to facilitate the transition at a first flex point; and
the movable central portion having a center and a frustum contiguous at a second ridge, with the second ridge being a second flex point for the transition.

16. The lithium-ion battery cell of claim 15, wherein the reversal device comprises the stationary perimeter portion and the movable central portion that are coextensive with one another, and wherein the folded configuration of the reversal device has the stationary perimeter portion and the movable central portion oriented crosswise relative to one another.

17. The lithium-ion battery cell of claim 16, wherein the unfolded configuration of the reversal device has the stationary perimeter portion and the movable central portion oriented parallel to one another.

18. The lithium-ion battery cell of claim 17, comprising:
the conductor positioned on top of the movable central portion, wherein the reversal device is configured to move the conductor into contact with the first terminal pad and the second terminal pad in response to the internal pressure reaching the threshold.

* * * * *